United States Patent [19]
Janssen

[11] 4,158,858
[45] Jun. 19, 1979

[54] TELEVISION SYSTEM WITH TWO FM SOUND CARRIERS

[75] Inventor: Peter J. H. Janssen, Eindhoven, Netherlands

[73] Assignee: U.S. Philips Corporation, New York, N.Y.

[21] Appl. No.: 873,730

[22] Filed: Jan. 30, 1978

[30] Foreign Application Priority Data

Feb. 28, 1977 [NL] Netherlands ................... 7702110

[51] Int. Cl.² ............................................. H04N 7/00
[52] U.S. Cl. .................................. 358/143; 358/144; 358/198; 358/186
[58] Field of Search ............... 358/143, 144, 197, 198, 358/186

[56] References Cited
U.S. PATENT DOCUMENTS 3,795,764  3/1974  Altmann .......................... 358/198 X Primary Examiner—Robert L. Richardson
Attorney, Agent, or Firm—Thomas A. Briody; William J. Streeter; Henry I. Steckler

[57] ABSTRACT

Television system having first and second FM sound carriers, the receiver comprising a picture intermediate frequency section, a conventional first sound demodulation circuit connected thereto via a video detector for demodulating a first sound signal being frequency modulated on the first sound carrier, and a new second sound demodulation circuit connected directly to the picture intermediate frequency section with which a second sound signal being frequency modulated on the second sound carrier can be demodulated, even at a low amplitude of the second sound carrier.

4 Claims, 2 Drawing Figures

TELEVISION SYSTEM WITH TWO FM SOUND CARRIERS

The invention relates to a receiver for television signals having a picture carrier and first and second frequency modulated sound carriers, the receiver comprising a picture intermediate frequency section and first and second sound demodulation circuits for demodulating a first and a second sound signal respectively, the first sound demodulation circuit of which is connected through a first detector to the picture intermediate frequency section.

Such a receiver is disclosed in the article "Das Zwei-Tontrager Verfahren" by S. Dinsel, Published in "Funkschau", 1971, Vol. 4, pages 105–108, which describes a system for the transmission of television signals having first and second sound carriers which are frequency modulated by first and second sound signals respectively.

With the prior art receiver the television signal of the picture intermediate frequency section is supplied to the first detector wherein the amplitude-modulated picture carrier and the two frequency-modulated sound carriers are mixed.

At the output of this first detector the first and second sound signals are available as a frequency-modulation on a first and a second intermediate carrier frequency being equal to the frequency interval between the picture carrier and the first sound carrier and to the frequency interval between the picture carrier and second, sound carrier respectively. A further processing of the sound signals on the respective first and second intermediate frequency sound carriers is thereafter effected in the respective first and second sound demodulation circuits which are connected to the output of the first detector. So the two sound signals are each recovered from the television signal in accordance with the conventional intercarrier method. In the system described in said article the frequency interval between the picture carrier and the first sound carrier is 5.5 MHz and that between the picture carrier and the second sound carrier is approximately 5.75 MHz. The minimum frequency interval between the second sound carrier and the picture carrier of an adjacent channel is, at a channel bandwidth of 7 MHz, only 1.25 MHz. If the receiver is tuned to the adjacent channel this second sound carrier must be attenuated to a sufficient degree to prevent disturbances in the picture signal. To this end the amplitude of the relevant second sound carrier must be small. However, this results in that also the amplitude of the second sound intermediate frequency carrier at the output of the first detector is small which, for the prior art receiver, may lead to an exceeding of the second sound intermediate frequency carrier by higher order products of the picture signal.

It is an object of the invention to provide a receiver of the type mentioned in the preamble in which also at small amplitudes of the second sound carrier, the latter is not exceeded by higher order products of the picture signal. The receiver according to the invention is therefore characterized in that the second sound demodulation circuit comprises a first bandpass filter for selecting the two sound carriers from the signal of the picture intermediate frequency section, a first mixing stage connected to an output of the first bandpass filter for a beating between the first and the second sound carrier and a second bandpass filter connected to the output of the mixing stage having a center frequency which corresponds to the frequency interval between the first and the second sound carrier for selecting this frequency from the output signal of the mixing stage.

The invention is based on the recognition that intercarrier demodulation is also possible with two carriers which are both frequency-modulated, namely the first and the second sound carrier. By separating both sound carriers from the picture signal before mixing them in the first mixing stage higher order products of the picture carrier are avoided and only intermodulation products of the two sound carriers in which the signal content of the second signal is presented either or not combined with the signal content of the first sound signal are obtained at the output of this mixing stage. Because generally the two sound carriers have the same drift, for example because the television signal has passed a tuner unit which is connected before the picture intermediate frequency section and which is liable to drift, that product at the output of the first mixing stage is selected the frequency of which corresponds to the frequency interval between the first and second sound carrier. In this selected product the drift of the first sound carrier is compensated by the drift of the second carrier.

A preferred embodiment of a receiver according to the invention wherein the first sound carrier is frequency-modulated by the first sound signal and the second sound carrier is frequency-modulated by the second sound signal is characterized in that the second sound demodulation circuit comprises a combining circuit for recovering the second sound signal from the output signal of the second bandpass filter, a first input of the combining circuit being connected to the first sound demodulation circuit and a second input of the combining circuit being connected to an output of the second bandpass filter.

The product selected in the present receiver by means of the second bandpass filter comprises the signal difference between the first and the second sound signal. To be able to recover the second sound signal therefrom the first sound signal obtained from the beating between the first sound carrier and the picture carrier in the first detector is added, by means of the combining circuit, with such phase and amplitude to said difference signal that the component of the first sound signal is compensated therein. Such a compensation is possible both prior and after demodulation to the audio-frequency range. A compensation in the audio-frequency range can be realized with a matrixing circuit wherein the demodulated first audio-frequency sound signal is combined with the demodulated, audio-frequency signal difference between the first and the second sound signal. For an acceptable compensation the first sound signal should be available with a phase and an amplitude which accurately agrees to that of the first sound signal component of said signal difference. In practice this can only be achieved by means of complicated and expensive control circuits.

Such control circuits are avoided in a further preferred embodiment of a receiver according to the invention. To this end the receiver is characterized in that the combining circuit comprises a second mixing stage which is connected via the first input to the connection between the first detector and the first sound demodulation circuit and via the second input to the output of the second bandpass filter, the combining circuit being provided with third bandpass filter connected to an output of this mixing stage and having a center frequency which corresponds to the frequency interval between the second sound carrier and the picture carrier. This measure is based on the recognition that the first sound signal at the output of the first detector and the first sound component of the signal difference between the first and the second sound signal at the output of the second bandpass filter are both derived from the same frequency modulated first sound signal of the intermediate frequency signal. Therefore these both signals accurately agree to each other.

A beating between the output signal of the second bandpass filter and the output signal of the first detector in the second mixing stage results in a product which exclusively contains the second sound signal frequency-modulated on a carrier having a frequency corresponding to the frequency interval between the second sound carrier and the picture carrier.

A transmitter for operation in conjunction with a receiver according to the invention, which transmitter comprises first and second sound modulation circuits for frequency-modulating the first sound carrier with the first sound signal and the second sound carrier with the second sound signal respectively is also disclosed in said article by S. Dinsel. In practice, however, it may be advantageous to modulate, in the transmitter, such combination of the first and second sound signal on the second sound carrier that when mixing this second sound carrier with the first sound carrier in the first mixing stage of the receiver a product is obtained which contains the second sound signal only.

Such a transmitter wherein the first sound modulation circuit comprises a first frequency modulator having a first modulation frequency, the second sound modulation circuit comprising a second frequency modulator with a second modulation frequency, is therefore characterized in that the second sound modulation circuit comprises a third mixer stage having first and second inputs, which first input being connected to an output of the first frequency modulator and the second input being connected to an output of the second frequency modulator, an output of the third mixer stage being connected to a bandpass filter the center frequency of which corresponds to the frequency of the second sound carrier and in that said second modulation frequency is equal to the frequency interval between the first and the second sound carrier and being lower than the first modulation frequency.

When applying this measure an audio-frequency first sound signal which is supplied to the first frequency modulator is frequency modulated on a carrier frequency corresponding to the first modulation frequency and an audio-frequency second sound signal which is supplied to the second frequency modulator is modulated on a carrier frequency corresponding to the second modulation frequency. At the output of the mixing stage the sum, or the difference respectively, of the two sound signals is frequency modulated on a carrier having a frequency corresponding to the sum frequency, or difference frequency respectively, of the first and the second modulation frequency. Because the second modulation frequency corresponds to the frequency interval between the two sound carriers to be transmitted, the product with the sum signal or that with the difference signal of the two sound signals is selected by means of the bandpass filter, depending on the choice of the frequency of the second sound carrier relative to that of the first sound carrier. As, in addition, the first modulation frequency exceeds the second modulation frequency, the second sound signal is frequency-modulated in the receiver according to the invention at the output of the first mixing stage on a carrier frequency corresponding to the frequency interval between the said first and second sound carrier.

The invention will be further described with reference to the figures shown in the drawing which are given by way of example.

Figure 1:
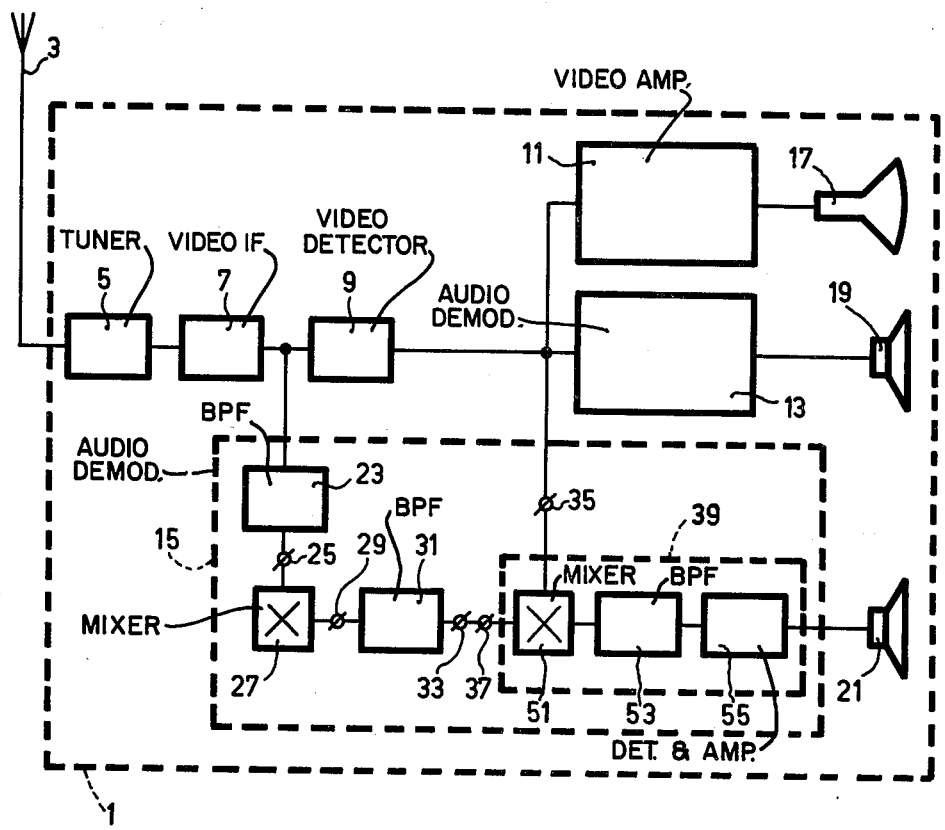
FIG. 1 shows a receiver according to the invention in which a first and a second mixing stage for demodulation of the second sound signal is used.

FIG. 1 shows a receiver 1, comprising a tuner 5, connected to an aerial 3, for converting a desired aerial signal into an intermediate frequency signal, a picture intermediate frequency section 7 connected to the tuner unit 5 for selecting and amplifying the intermediate frequency signal, a first detector 9 connected to the picture intermediate frequency section 7 for demodulating the intermediate frequency signal in a video signal, a video amplifier 11 connected to the first detector 9 and a display tube 17 for respectively amplifying and displaying the video signal, a first sound demodulation circuit 13 which is also connected to the first detector 9 and a first loudspeaker 19 respectively for demodulating and reproducing the first sound signal from the intercarrier sound signal originating from the first detector, and also comprising a second sound demodulation circuit 15 connected to the picture intermediate frequency section 7 and a second loudspeaker 21 for respectively demodulating and reproducing the second sound signal from the intermediate frequency signal.

The second sound demodulation circuit 15 comprises a first bandpass filter 23 connected to the picture intermediate frequency section 7 for selecting the two sound carriers from the intermediate frequency signal and connected thereto, in this sequence: via an output terminal 25 of the first bandpass filter 23 a first mixing stage 27 for mixing the first and the second sound carrier, via an output terminal 29 of the first mixing stage 27 a second bandpass filter 31 for selecting that frequency corresponding to the frequency interval between the first and the second sound carrier from the output signal of the mixing stage 27, via an output terminal 33 of the second bandpass filter 31 a combining circuit 39 which is connected by means of a first input 35 to the connection between the first detector 9 and the first sound demodulation circuit 13 and, by means of a second input 37, to the output terminal 33 of the second bandpass filter 31. The combining circuit 39 comprises a second mixing stage 51 which is connected via the first input 35 to the connection between the first detector 9 and the first sound demodulation circuit 13 and, via the second input 37, to the output 33 of the second bandpass filter 31. An output of the second mixing stage 51 is connected via a bandpass filter 53 to a frequency detector and signal amplifier 55, an audio-frequency output of which is connected to the second loudspeaker 21.

If the intermediate frequency signal of the picture intermediate frequency section 7 has a picture carrier at, for example, a 38.9 MHz and first and second sound carriers at 33.4 and 33.16 MHz respectively at which the sound signal $S_1$ and $S_2$ respectively are frequency-modulated then, after demodulation in the first detector 9, the first sound carrier is transposed in accordance with the intercarrier demodulation principle to a frequency of 5.5 MHz. A further demodulation to audio-frequencies is effected in the first sound demodulation circuit 13.

The two sound carriers are filtered from the intermediate frequency signal in the first bandpass filter 23 of the second sound demodulation circuit 15 and in the first mixing stage 27. Sum and difference signals of the two sound carriers are present at the output terminal 29. The sum carrier (66.56 MHz) is frequency modulated with the sum signal $(S_1+S_2)$ and the difference carrier (0.24 MHz) is frequency modulated with the difference signal $(S_1-S_2)$. A drift of the intermediate frequency signal, for example, because of a drift of the tuning unit 5, produces at the output terminal 29 of the mixing stage 27 a drift in the carrier of the sum signal $(S_1+S_2)$ which is twice as large. In the carrier of the difference signal $(S_1-S_2)$, on the contrary, the drift of the first sound carrier fully compensates the equal, but opposite drift of the second sound carrier. The second bandpass filter 31 therefore selects the difference carrier of $(S_1-S_2)$ and has for this purpose a center pass band frequency which corresponds to the frequency interval between the first and the second sound carrier, which in this example is 0.24 MHz.

In order to recover the second sound signal $S_2$ from the difference signal $(S_1-S_2)$ being frequency modulated on a 0.24 MHz carrier, this difference signal is multiplied in the second mixing stage 51 by the first sound signal $-S_1$ which is frequency modulated on a 5.5 MHz carrier being available at the output of the first detector 9. Because in the first detector 9 the first sound carrier is mixed with the picture carrier, the phase of the first sound signal at the output of the detector 9 is opposite to the phase of the first sound signal of the intermediate frequency signal.

At the output of the second mixing stage 51 there is a product in which the second sound signal is frequency-modulated on a carrier having a frequency which is equal to the frequency interval between the second sound carrier and the picture carrier, that is to say 5.74 MHz.

As the frequency swing of the signal $-S_1$ at the first input 35 is equal to the frequency swing of the signal $S_1$ in the difference signal $(S_1-S_2)$ at the second input 37, because the two signals have the same origin, namely the first sound signal $S_1$ in the intermediate frequency signal of the picture intermediate frequency section 7 and because differences in delay between the two signal are negligibly small at a proper choice of the phase frequency characteristic of the bandpass filters a full compensation of the signal $S_1$ in the difference signal $(S_1-S_2)$ is possible, so that only the second sound signal is present in said product at the output of the second mixing stage 51.

Said delay differences can possibly be fully cancelled by using simple delay networks, not shown in the drawing. They can, for example, be connected between the first detector 9 and the first input 35 and/or between the second bandpass filter 31 and the second input 37.

To select said mixed product with the second sound signal $S_2$ from other mixed products, the output of the mixing stage 51 is connected to a third bandpass filter 53 whose center passband frequency is equal to said frequency interval.

Demodulation and amplification of the second sound signal $S_2$ which is frequency-modulated on a carrier, the given example with a frequency of 5.74 MHz, is thereafter performed in a frequency detector and amplifier 55, connected to the third bandpass filter 53, whereafter reproduction takes place by means of the second loudspeaker 21.

Figure 2:
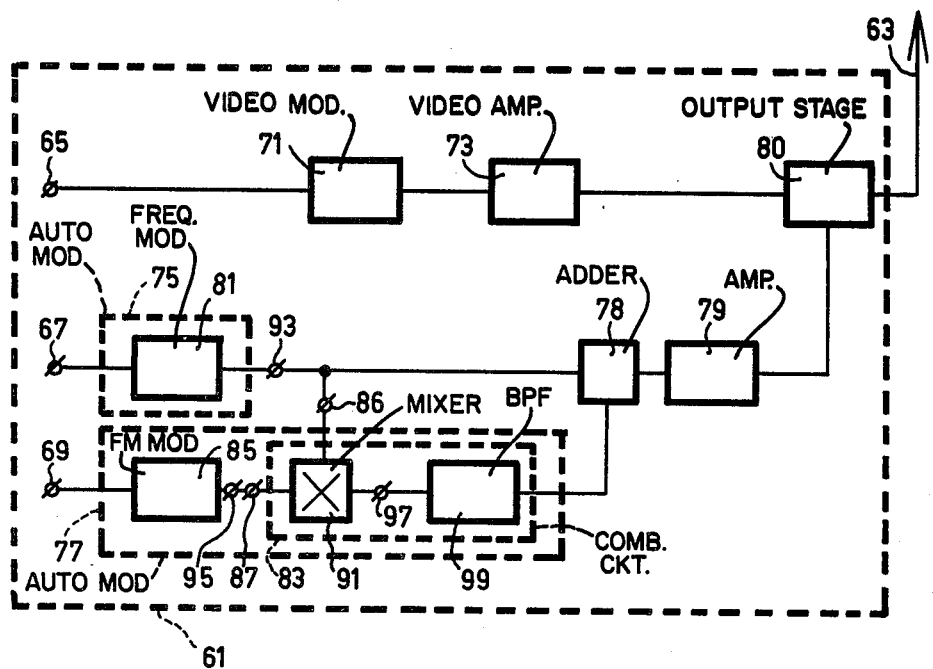
FIG. 2 shows a transmitting-receiving system wherein a mixing stage is used in the transmitter for modulating in accordance with the invention the second sound carrier by a combination of the first and the second sound signal and wherein a compensation of the first sound signal of this combination is effected in the first mixing stage of the receiver according to the invention.
Figure 2:
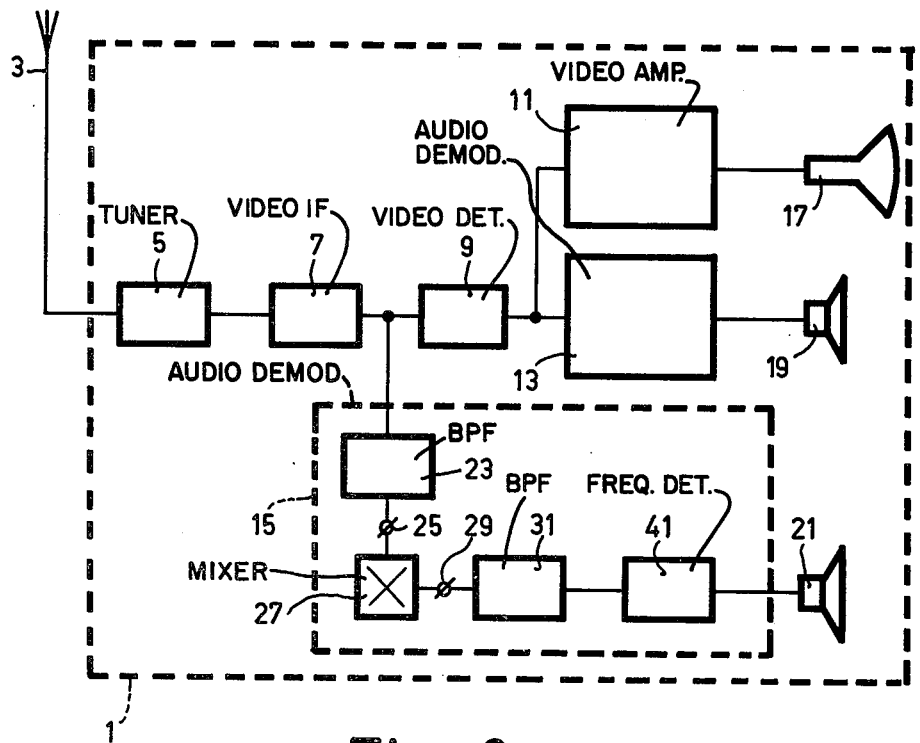

FIG. 2 shows a transmitting-receiving system provided with a transmitter 61, wherein a first sound signal $S_1$ being supplied to a first audio-frequency input 67 is frequency modulated on a first sound carrier and a combination of the first sound signal $S_1$ and a second sound signal $S_2$ which is supplied to a second audio-frequency input 69 is frequency modulated on a second sound carrier. The system is also provided with a receiver 1 according to the invention in which no use is made of the combining circuit 39 of the receiver of FIG. 1.

The transmitter 61 comprises a picture modulation circuit 71 having an input terminal 65 and first and second sound modulation circuit 75 and 77 with audio-frequency input terminals 67 and 69 respectively. The picture modulation circuit 71 is connected via a picture amplifier 73 and the two sound modulation circuits 75 and 77 via an adder circuit 78 and a common amplifier 79, to a transmitter output stage 80. In this transmitter output stage 80 a picture signal which is modulated on a picture carrier is combined with two sound signals which are frequency-modulated on a first and a second sound carrier to form a complete television transmitting signal. The transmitting output stage 80 is connected to a transmitting aerial 63.

The first sound modulation circuit 75 mainly consists of a first frequency modulator 81 having a first modulation frequency $m_1$ connected to the audio-frequency input 67 and, through an output 93, to the adder circuit 78. The second sound modulation circuit 77 comprises a second frequency modulator 85 having a second modulation frequency $m_2$ which is connected through an output 95 to a combining circuit 83. An input of the frequency modulator 85 is connected to the audio-frequency input terminal 69. The combining circuit 83 comprises a third mixing stage 91 which is connected through a first input 86 to the output 93 of the first frequency modulator 81 and through a second input 87 to the output 95 of the second frequency modulator 85. An output 97 of this third mixing stage 91 is connected through a fourth bandpass filter 99 to the adder circuit 78.

If the frequency of the first sound carrier at the output 93 of the first frequency modulator 81 is fixed at a value $f_1$, the first modulation frequency $m_1$ should then be chosen equal thereto.

If the frequency of the second sound carrier at the output of the fourth bandpass filter 99 is fixed at a value $f_2$, wherein $f_2 \neq f_1$ then the second modulation frequency $m_2$ should be chosen to be equal to the frequency difference $f_1-f_2$, or $f_2-f_1$.

At the output 97 of the third mixing stage 91 the sum $(S_1+S_2)$ and the difference $(S_1-S_2)$ respectively of the two sound signals are frequency modulated on a carrier at a frequency corresponding to the sum $(m_1+m_2)$ and the difference frequency $(m_1-m_2)$ respectively of the carriers supplied to the inputs 86 and 87.

If $f_2$ is chosen to be smaller than $f_1$ then the difference signal $(S_1-S_2)$ is selected by means of the bandpass filter 99, whose center pass frequency is equal to $f_2$. If $f_2$ is chosen to be greater than $f_1$ then the sum signal $(S_1+S_2)$ is selected by means of this bandpass filter 99. If, in addition, $f_1$ is chosen to exceed the absolute frequency difference between $f_1$ and $f_2$, so if $m_1>m_2$, the frequency interval between the two sound carriers $f_1$ and $f_2$ will be independent of the first sound signal $S_1$ both for $f_2>f_1$ and for $f_2<f_1$. By this a product at the output of the first mixing stage 27 of the receiver 1 according to the invention is achieved, by multiplying the first sound carrier, being frequency modulated with $S_1$, with the second sound carrier, being frequency modulated with $(S_1+S_2)$ or $(S_1-S_2)$, which product only includes the second sound signal, frequency modulated on a carrier frequency corresponding to the frequency interval $(f_1-f_2)$.

The two frequency-modulated sound carriers are amplified in the amplifier 79 of the transmitter 61 and combined in the transmitter output stage 80 with the picture carrier to form a complete television transmitting signal. This may require a frequency conversion wherein the first and the second sound carrier $f_1$ and $f_2$ are brought to a given frequency distance relative to the picture carrier, for example at frequencies $F_1$ and $F_2$. By choosing the absolute frequency difference $(f_1-f_2)$ equal to the absolute frequency difference $(F_1-F_2)$ of the first and the second sound carriers to be transmitted, the two sound carriers can be adjusted in the same frequency conversion to the correct position relative to the picture carrier.

In the receiver 1, in which the circuits which correspond to the circuits of the receiver of FIG. 1 have been given the same reference numerals, the first sound signal $S_1$ is demodulated in the manner described for the preceding Figure. The second sound signal $S_2$ is recovered by multiplying in the mixing stage 27, the first sound carrier which is frequency modulated with the sound signal $S_1$ with the second sound carrier which is frequency modulated with the sound signal $(S_1+S_2)$ or $(S_1-S_2)$. The sound signal $S_2$ or $-S_2$ respectively is then available at the output 29 as a frequency modulation on a carrier frequency corresponding to the frequency interval between the first and the second sound carrier $(f_1-f_2)$ which, in the example given in the description of the first Figure, works out to be 0.24 MHz. This carrier frequency is selected by means of the second bandpass filter 31 from the output signal of the first mixing stage 27 whereafter demodulation to audio-frequency is effected in the frequency detector 41.

The separation between the first and the second sound signal by means of the receivers 1 according to the invention, shown in FIG. 1 and FIG. 2 is great enough to reproduce, for example for a transmitted television program with two different commentaries, one of the commentaries by switching on one of the two loudspeakers, the other commentary not being audible in the desired commentary.

The requirements imposed on the separation between the first and the second sound signal are less strict for stereo transmissions.

If so desired the sum signal L+R can be used as first sound signal $S_1$ by means of an audio-frequency matrixing in the transmitter and, for the second sound signal $S_2$, the difference signal L−R, wherein L represents the "left-hand" and R the "right-hand" sound information of a stereo sound signal.

In the receiver 1 a matrixing circuit, not shown, should then be included between the audio-frequency outputs of the two sound demodulation circuits and the two loudspeakers.

The cross talk which is introduced in this matrixing circuit can be acceptable in stereo reproduction.

What is claimed is:

1. A receiver for television signals having a picture carrier and a first and a second frequency-modulated sound carrier, the receiver comprising a picture intermediate frequency section, first and second sound demodulation circuit means for demodulating a first and a second sound signal respectively, a first detector coupled to the picture intermediate frequency section, said first sound demodulation circuit means being coupled to said first detector, the second sound demodulation circuit comprising a first bandpass filter means coupled to the picture intermediate frequency section for selecting the two sound carriers from the signal of the picture intermediate frequency section, a first mixing stage means coupled to an output of the first bandpass filter for mixing the first and the second sound carrier, and a second bandpass filter means coupled to the output of the mixing stage and having a center passband frequency which corresponds to the frequency interval between the first and the second sound carrier for selecting said frequency interval from the output of the mixing stage.

2. A receiver as claimed in claim 1, wherein the frequency of the first sound carrier is modulated by the first sound signal and the frequency of the second sound carrier is modulated by the second sound signal, and that the second sound demodulation circuit comprises a combining circuit means for recovering the second sound signal from the output signal of the second bandpass filter, a first input of the combining circuit being coupled to the first sound demodulation circuit and a second input of the combining circuit being coupled to an output of the second bandpass filter.

3. A receiver as claimed in claim 2, wherein the combining circuit comprises a second mixing stage which is coupled through the first combining circuit input to the connection between the first detector and the first sound demodulation circuit and through the second combining circuit input to the output of the second bandpass filter, the combining circuit being provided with a third bandpass filter coupled to an output of said second mixing stage and having a center passband frequency which corresponds to the frequency interval between the second sound carrier and the picture carrier.

4. A transmitter comprising, first and second sound modulation circuit means for modulating the frequency of first and second sound carriers, said modulation circuits respectively including first and second frequency modulators having first and second modulation frequencies respectively, the second sound modulation circuit comprising a mixing stage having first and second inputs, the first input being coupled to an output of the first frequency modulator and the second input being coupled to an output of the second frequency modulator, and a bandpass filter coupled to an output of said mixing stage and having a center passband frequency which corresponds to the frequency of the second sound carrier, said second modulation frequency being equal to the frequency interval between the first and the second sound carrier and being smaller than the first modulation frequency.

* * * * *